(12) United States Patent
Zack et al.

(10) Patent No.: US 7,836,701 B2
(45) Date of Patent: Nov. 23, 2010

(54) INFRARED SUPPRESSION SYSTEM

(75) Inventors: David W. Zack, Hamden, CT (US);
John Chapkovich, Derby, CT (US);
Richard A. Fitts, Monroe, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 244 days.

(21) Appl. No.: 12/020,625

(22) Filed: Jan. 28, 2008

(65) Prior Publication Data

US 2008/0245061 A1 Oct. 9, 2008

Related U.S. Application Data

(63) Continuation of application No. 11/194,229, filed on Aug. 1, 2005.

(51) Int. Cl.
*F02K 1/38* (2006.01)
(52) U.S. Cl. .............................. 60/772; 60/779; 60/39.5
(58) Field of Classification Search ................... 60/772, 60/779, 39.5, 204, 226.1, 770, 257, 260, 60/39.091, 39.094, 583, 587; 220/745–750
See application file for complete search history.

(56) References Cited

U.S. PATENT DOCUMENTS

| | | | |
|---|---|---|---|
| 3,981,143 A | * | 9/1976 | Ross et al. ..................... 60/264 |
| 3,981,448 A | | 9/1976 | Demogenes et al. |
| 4,295,332 A | * | 10/1981 | Steyer et al. ................... 60/264 |
| 5,699,966 A | | 12/1997 | Beverage |
| 5,992,140 A | | 11/1999 | Hammond et al. |
| 6,016,651 A | | 1/2000 | Hammond et al. |
| 6,122,907 A | | 9/2000 | Frawley |
| 6,134,879 A | | 10/2000 | Frawley et al. |
| 6,742,339 B2 | | 6/2004 | Horner |

FOREIGN PATENT DOCUMENTS

| | | |
|---|---|---|
| DE | 3129305 | 2/1983 |
| EP | 0286800 | 10/1988 |
| GB | 2100798 | 1/1983 |

OTHER PUBLICATIONS

European Search Report mailed Mar. 10, 2009.

* cited by examiner

*Primary Examiner*—Michael Cuff
*Assistant Examiner*—Vikansha S Dwivedi
(74) *Attorney, Agent, or Firm*—Carlson Gaskey & Olds PC (57) ABSTRACT

An InfraRed Suppression System (IRSS) vectors engine exhaust flow away from the exhaust manifold plane, the high aspect ratio exhaust duct defined as a ratio of a maximum nozzle length to a maximum nozzle width, the ratio greater than 2:1.

33 Claims, 10 Drawing Sheets

INFRARED SUPPRESSION SYSTEM

This application is a continuation of U.S. application Ser. No. 11/194,229, which was filed on Aug. 1, 2005.

BACKGROUND OF THE INVENTION

The present invention relates to an infrared (IR) suppression system, and more particularly to a rotary wing aircraft having an upwardly directed infrared suppression system which (1) masks engine exhaust IR energy, which may signal ground threats during forward flight, and (2) minimizes engine exhaust impingement on adjacent aircraft structure to reduce the overall IR signature of the rotary wing aircraft.

The exhaust ducting from a gas turbine engine is a source of high infrared energy which may be detected by heat seeking missiles and/or various forms of infrared imaging systems for targeting/tracking purposes. With respect to the former, generally speaking, a heat-seeking missile obtains directional cues from the infrared energy generated by the engine exhaust such that the amount of infrared energy given off is one of the primary determining factors of a missile's accuracy, and consequently, lethality. Regarding the latter, infrared imaging systems detect and amplify the infrared energy for detection and/or targeting.

Current IR suppression systems are utilized on many military aircraft including most rotary wing aircraft to provide IR signature reduction. Future IR threats, however, will require even greater levels of aircraft IR signature reduction.

Generally, IR suppression systems are primarily designed to: (a) reduce the infrared energy below a threshold level of a perceived threat; (b) maintain engine performance; and (c) minimize weight and packaging associated therewith. Secondary consequences may include: (i) minimizing system or configuration complexity to reduce fabrication and maintainability costs; and (ii) minimizing the external aerodynamic drag produced by such IR suppressor systems.

Current suppression systems for rotary wing aircraft are primarily designed to provide significant IR signature reduction during a hover flight profile. Generally, current suppressor systems operate by mixing the high temperature exhaust flow with cool airflow supplied by a mixing duct which communicates with an engine exhaust duct. The mixing of large amounts of ambient air with the engine exhaust may significantly reduce the overall gas temperature prior to discharging the engine exhaust overboard, thereby lowering the aircraft IR signature. To achieve significant reductions in temperature, however, a relatively significant volume of ambient air must be mixed with the high temperature exhaust flow. This requires relatively large intakes and a final exhaust stage which provides a flow area capacity for both the engine exhaust flow volume and the mixed in additional ambient airflow volume. Another disadvantage of such an IR suppressor system is limited by the packaging space restrictions. That is, the elongate mixing areas downstream of the engine need to be of a relatively significant length to provide ample mixing and flow area. Adaptation to relatively small rotary wing aircraft or retrofitting to aircraft which require maintaining current packaging constraints is therefore limited.

It is also desirable to minimize impingement of hot engine exhaust onto adjacent aircraft structure so that the generation of "hot spots" separate from the primary source associated with the nozzle/exhaust plume are avoided. Disadvantageously, the mixing operation may reduce the velocity of the exhaust flow such that the exhaust velocity may be too low to expel the exhaust far enough from the fuselage to avoid such "hot spots." A further disadvantage is that if the exhaust gas does not have enough velocity to escape rotor downwash, the exhaust gas may be re-ingested into the engines which may reduce engine efficiency.

Accordingly, it is desirable to provide an infrared suppression system which reduces the overall IR signature of the aircraft, is compact in design, masks the IR energy emitted/radiated from the gas turbine engine for a given viewing/azimuth angle, and minimizes impingement of engine exhaust onto adjacent aircraft structure while maintaining aircraft performance characteristics.

SUMMARY OF THE INVENTION

An InfraRed Suppression System according to an exemplary aspect of the present invention includes: an exhaust manifold which receives an engine exhaust flow, the exhaust manifold having an inboard portion and an outboard portion, the exhaust manifold defining an exhaust manifold plane which passes through the inboard portion and the outboard portion; and a high aspect ratio exhaust duct in communication with the exhaust manifold to vector the engine exhaust flow away from the exhaust manifold plane, the high aspect ratio exhaust duct defined as a ratio of a maximum nozzle length to a maximum nozzle width, the ratio greater than 2:1.

An InfraRed Suppression System for a rotary-wing aircraft which defines a waterline according to an exemplary aspect of the present invention includes an exhaust manifold which receives an engine exhaust flow; and a high aspect ratio exhaust duct in communication with the exhaust manifold, the high aspect ratio exhaust duct vectors the engine exhaust flow away from the waterline, the high aspect ratio exhaust duct defined as a ratio of a maximum nozzle length to a maximum nozzle width, the ratio greater than 2:1.

A rotary-wing aircraft which defines a waterline according to an exemplary aspect of the present invention includes an exhaust manifold which receives an engine exhaust flow; and a high aspect ratio exhaust duct in communication with the exhaust manifold, the high aspect ratio exhaust duct defined as a ratio of a maximum nozzle length to a maximum nozzle width, the ratio greater than 2:1.

A method of suppressing IR energy of a high temperature engine exhaust flow from a rotary wing aircraft defining a waterline according to an exemplary aspect of the present invention includes vectoring a high temperature engine exhaust flow through a high aspect ratio exhaust duct substantially away from the waterline, the high aspect ratio exhaust duct defined as a ratio of a maximum nozzle length to a maximum nozzle width, the ratio greater than 2:1.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
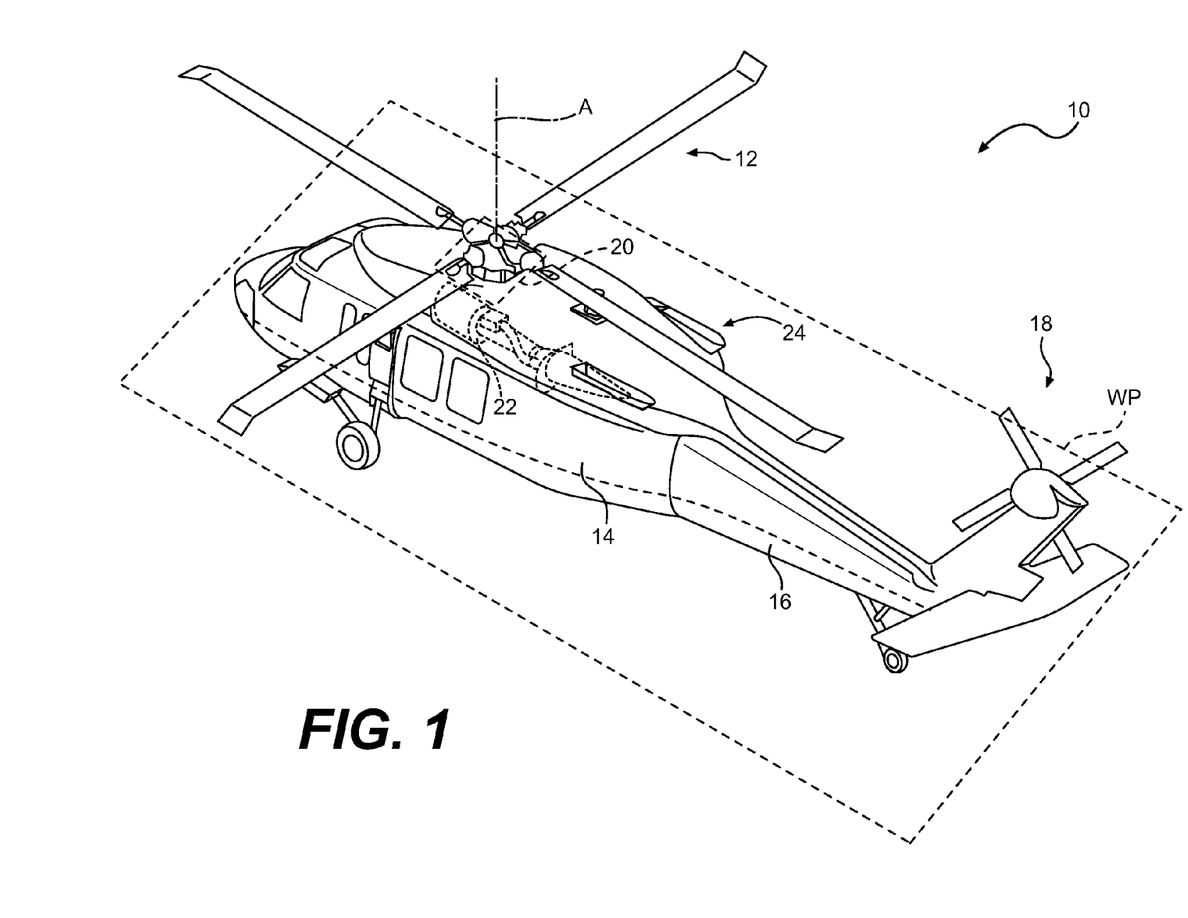
FIG. 1 is a general perspective view an exemplary rotary wing aircraft embodiment illustrating an exemplary installation of an IR suppressor system according to the present invention.

FIG. 1 schematically illustrates a rotary-wing aircraft 10 having a main rotor system 12. The aircraft 10 includes an airframe 14 having an extending tail 16 which mounts an anti-torque tail rotor system 18. The main rotor system 12 is driven about an axis of rotation A through a transmission (illustrated schematically at 20) by one or more gas turbine engines 22. Although a particular helicopter configuration is illustrated in the disclosed embodiment, other configurations and/or machines will also benefit from the present invention.

The rotary wing aircraft 10 also includes an InfraRed Suppression System (IRSS) 24 in communication with each gas turbine engine 22. The IRSS 24 suppresses the IR signature radiating from the high-temperature exhaust generated by the gas turbine engines 22. In the context used herein, "suppress" means that the IR signature emanating from the gas turbine engine 22 is reduced after passage through the IRSS 24 below that as expelled by the gas turbine engine 22.

The IRSS 24 is sized and configured to direct the high temperature exhaust gas and resultant IR energy generally upward relative to a waterline plane W passing through the aircraft 10 and towards the main rotor system 12. Plane W is a geometric plane that passes through the aircraft 10 and which is generally parallel with the longitudinal axis of the aircraft 10 and substantially transverse to the axis of rotation A. It should be understood that relative positional terms such as "forward," "aft," "upper," "lower," "above," "below," and the like are with reference to the normal operational attitude of the vehicle and should not be considered otherwise limiting.

Moreover, the IRSS 24 may be sized and configured to minimize impingement of engine exhaust onto adjacent aircraft structure by discharging the flow upwardly and/or outwardly, away from the airframe 14 thereby reducing fuselage heating due to plume impingement in both hover and forward flight which in turn minimizes fuselage IR signature contributions.

By directing the exhaust stream generally upward and/or outward, away from the airframe 14, a direct line of sight to the exhausted IR energy is masked from ground threats, which facilitates IR energy suppression during forward flight which is contrary to conventional IR suppressors that primarily focus on reducing IR energy during hover. These conventional suppressors, which typically operate by diluting engine exhaust flow with ambient air, generally require a higher secondary bypass area and a relatively large lobed nozzle suppressor system which is not incorporated into the present invention such that the IRSS 24 may be contained within a relatively smaller space and yet still direct exhaust flow away from the airframe 14 to achieve comparable or superior IR suppression performance characteristics with significantly less secondary cooling air volume. That is, the IRSS 24 directs substantially all the exhaust flow (total airflow) upwardly and/or outwardly, away from the airframe 14 without significant secondary airflow mixing such that the exhaust gas from the gas turbine engine 22 (primary airflow) in relation to the secondary airflow (i.e., $A_c$ and $A_{ram}$) defines less than a traditional 1:1 ratio (secondary versus primary airflow) ejector system. The IRSS 24 achieves such signature reduction performance levels by reducing the required hover primary to secondary area ratio when utilizing Aram. Significantly lower IR suppression is thereby achieved with this design approach.

Figure 2:
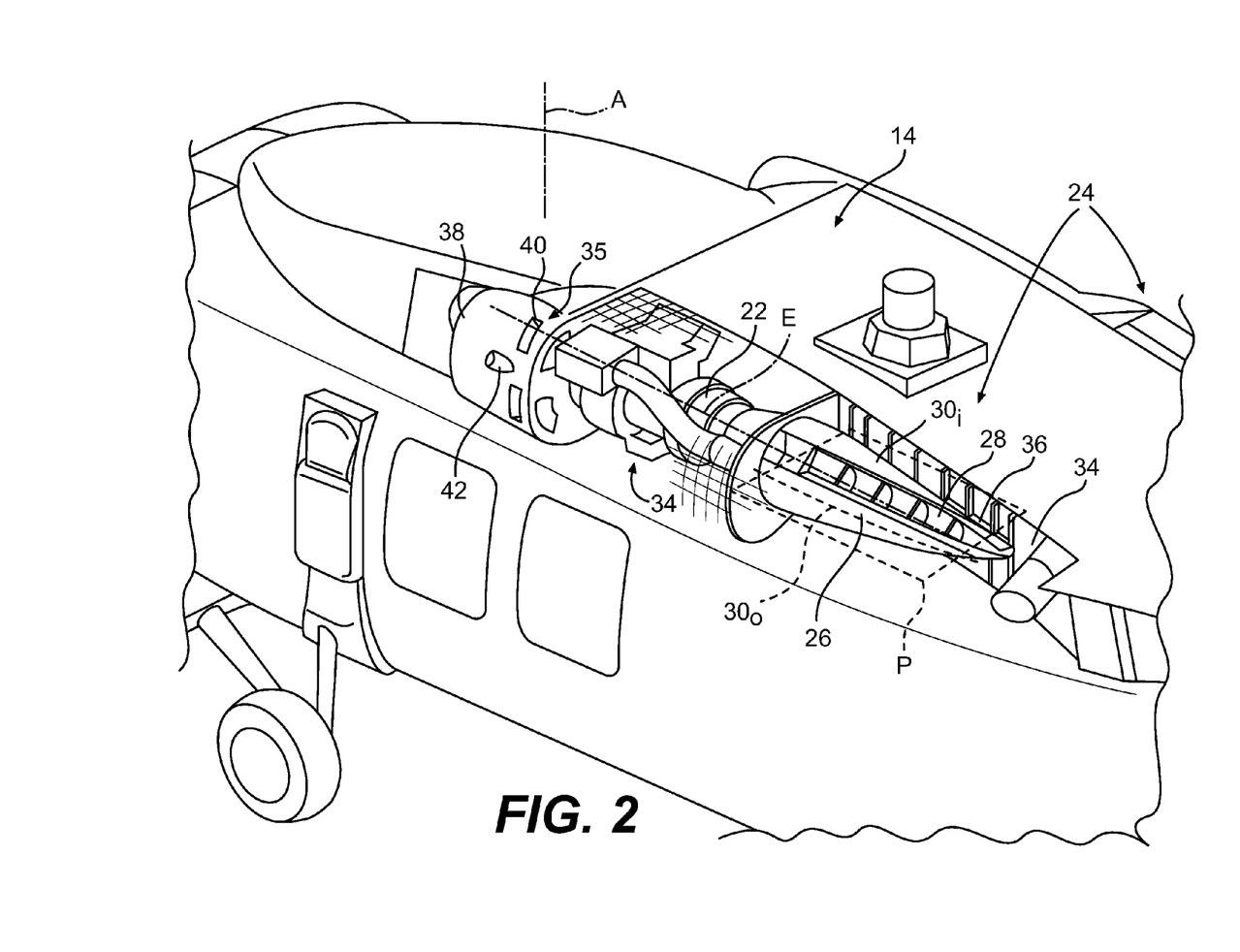
FIG. 2 is an expanded partial phantom perspective view of the IR suppressor system according to the present invention.
Figure 3:
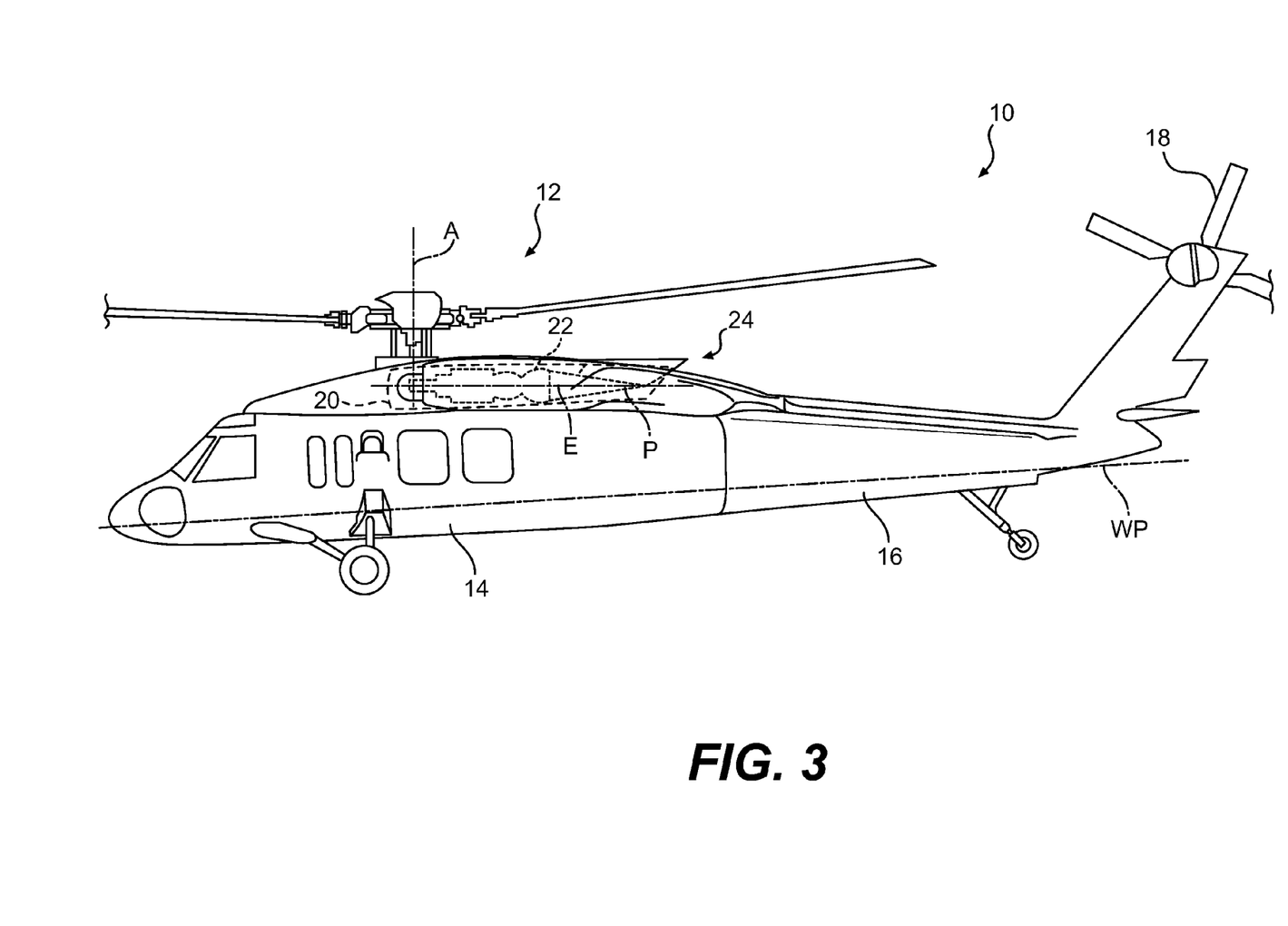
FIG. 3 is a side view of an exemplary rotary wing aircraft embodiment illustrating an exemplary installation of an IR suppressor system according to the present invention.
Figure 4:
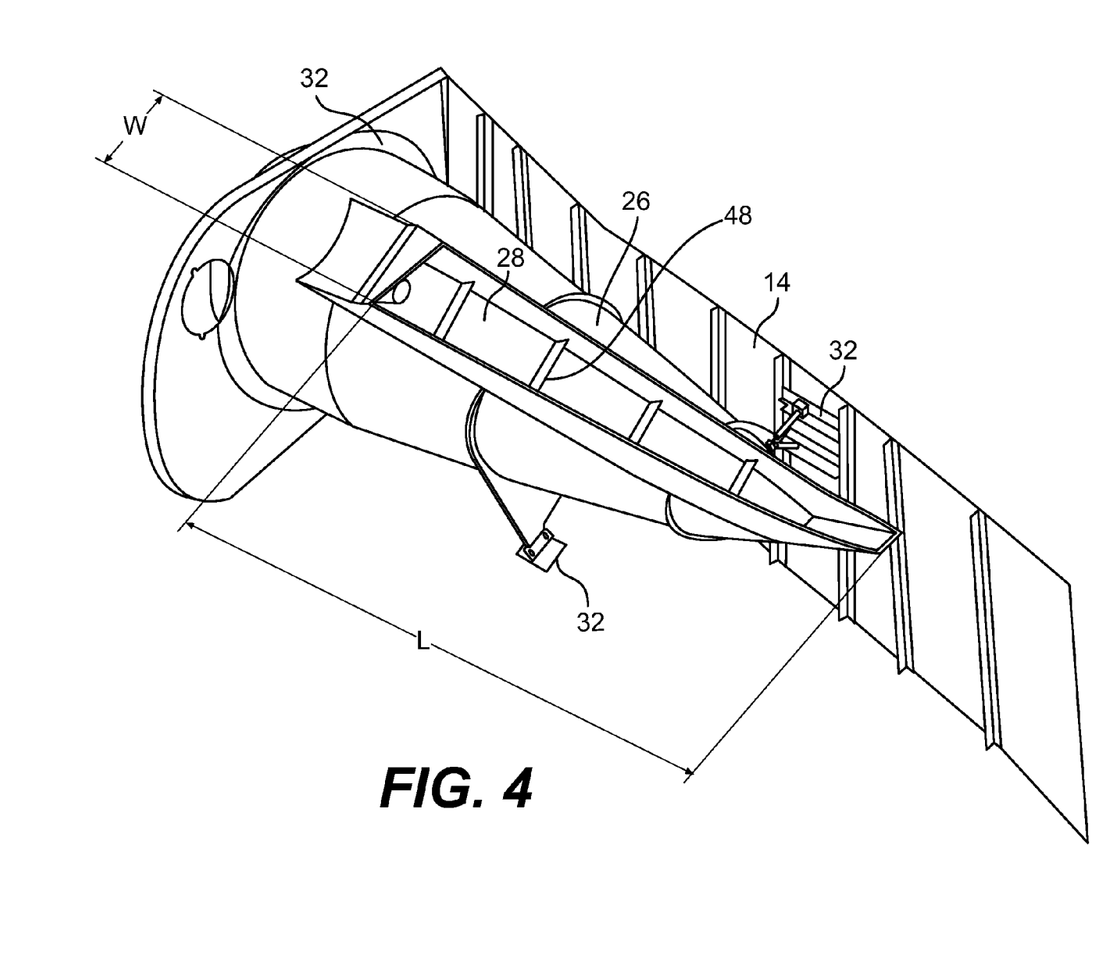
FIG. 4 is an expanded perspective view of the IR suppressor system illustrating an attachment to the airframe from a generally aft direction.

Referring to FIG. 2, the IRSS 24 is located adjacent to the gas turbine engine 22 and generally includes an exhaust manifold 26 and a high aspect ratio exhaust duct 28 along a longitudinal length of the exhaust manifold 26. As defined herein "high aspect ratio" is a ratio of the maximum nozzle length L to the maximum nozzle width W (best seen in FIGS. 4 and 7A). In one non-limiting embodiment, the ratio is greater than 2:1. The IRSS 24 achieves signature reduction levels as previous higher aspect ratio systems, by controlling the direction of the exhaust airflow vector and line-of-sight to hot metal. Significantly lower IR suppressor system weight and engine performance impacts, however, are also achieved with this design approach The exhaust manifold 26 receives a primary flow of high temperature engine exhaust from the gas turbine engine 22. The exhaust manifold 26 extends along a longitudinal engine axis E of the gas turbine engine 22 and is generally frustroconical. Similarly, the high aspect ratio exhaust duct 28 may be longitudinally in-line with the longitudinal engine axis E for more efficient exhaust flow management which also minimizes the effects of aircraft flight qualities. The high aspect ratio exhaust duct 28 extends laterally (from or to) the exhaust manifold 26. That is, the longitudinal axis of the high aspect ratio exhaust duct 28 in one non-limiting embodiment is parallel with the longitudinal axis of the engine E, however, the high aspect ratio exhaust duct 28 extends partially transverse to the longitudinal engine axis E and above an exhaust manifold plane P which passes through an inboard portion 30i and an outboard side portion 30o of the exhaust manifold 26. The exhaust manifold plane P as defined herein is generally parallel to the aircraft plane W (as also illustrated in FIG. 3). This enables the high aspect ratio exhaust duct 28 to operate as an IR energy redirector in which the IR energy is directed upwardly and/or outwardly, away from observers on the ground.

Thus, the exhaust manifold 26 directs the high temperature exhaust gas flow from the aft end of the gas turbine engine 22 through the high aspect ratio exhaust duct 28 which directs the IR energy upwardly and/or outwardly, away from observers on the ground. This approach masks a direct view of the IR energy signature from the high aspect ratio exhaust duct 28 which may otherwise be presented to ground based IR threats. Furthermore, the shape and orientation of the high aspect ratio exhaust duct 28 minimizes exhaust flow impingement onto the airframe 14 which significantly reduces the formation of secondary IR source contributors thereby further minimizing the general aircraft thermal signature.

As illustrated, the exhaust manifold 26 in one non-limiting embodiment is of a substantially conical shape such that the high temperature exhaust gas flow passes through a smaller volume as the exhaust gases moves along the longitudinal length of the exhaust manifold 26 to provide a generally consistent exhaust flow through the exhaust duct 28.

The exhaust manifold 26, having a relatively compact packaging envelope, may be attached to the airframe 14 by attachments 32 (FIG. 4) such that the exhaust manifold 26 is contained within an aerodynamic exhaust fairing 34 (illustrated in phantom: FIG. 2) which aerodynamically encloses a significant portion of the IRSS 24 to obscure line of sight to the high temperature components thereof. It should be understood that various attachments 32 may be utilized with the present invention, however, attachments which permit aerodynamic minimization of the exhaust fairing 34 such that the aerodynamic exhaust fairing 34 provides minimal aerodynamic impact to the aircraft are preferred.

The aerodynamic exhaust fairing 34 may be manufactured of a non-metallic material so that the fairing 34 operates as a line-of-sight thermal barrier for the high aspect ratio exhaust duct 28. The aerodynamic exhaust fairing 34 may be located adjacent to, but spaced away from the high aspect ratio exhaust duct 28 to obstruct viewing from a direct line-of-sight to the high temperature components of the IRSS 24 when the line of sight is through the aircraft waterline plane WP, e.g., from below the aircraft.

The aerodynamic exhaust fairing 34 in one non-limiting embodiment defines an air-cooled ejector gap 36 (also illustrated in FIGS. 5A, 5B) between the exhaust fairing 34 and the exhaust duct 28. The air-cooled ejection gap 36 provides an insulated thin film cooling airflow which further insulates the high aspect ratio exhaust duct 28 from the aerodynamic exhaust fairing 34. The air cooled ejector gap 36 also dispenses a relatively cool airflow which further sheaths the high temperature exhaust gas flow exhausted from the high aspect ratio exhaust duct 28.

The aerodynamic exhaust fairing 34 in one non-limiting embodiment is located adjacent to and aft of, an intake fairing 35 which incorporates an engine intake 38. One or more engine compartment air scoops 40, and one or more fairing inlets 42 may be located in the aerodynamic exhaust faring 34 separate from the engine intake 38. Alternatively, or in addition, as shown in FIG. 2, one or more of the engine compartment air scoops 40, and one or more of the fairing inlets 42 may be located in the intake fairing 35. It should be understood that various air scoops and inlets may be utilized with the present invention and may be located in various positions on the aircraft.

Figure 5A:
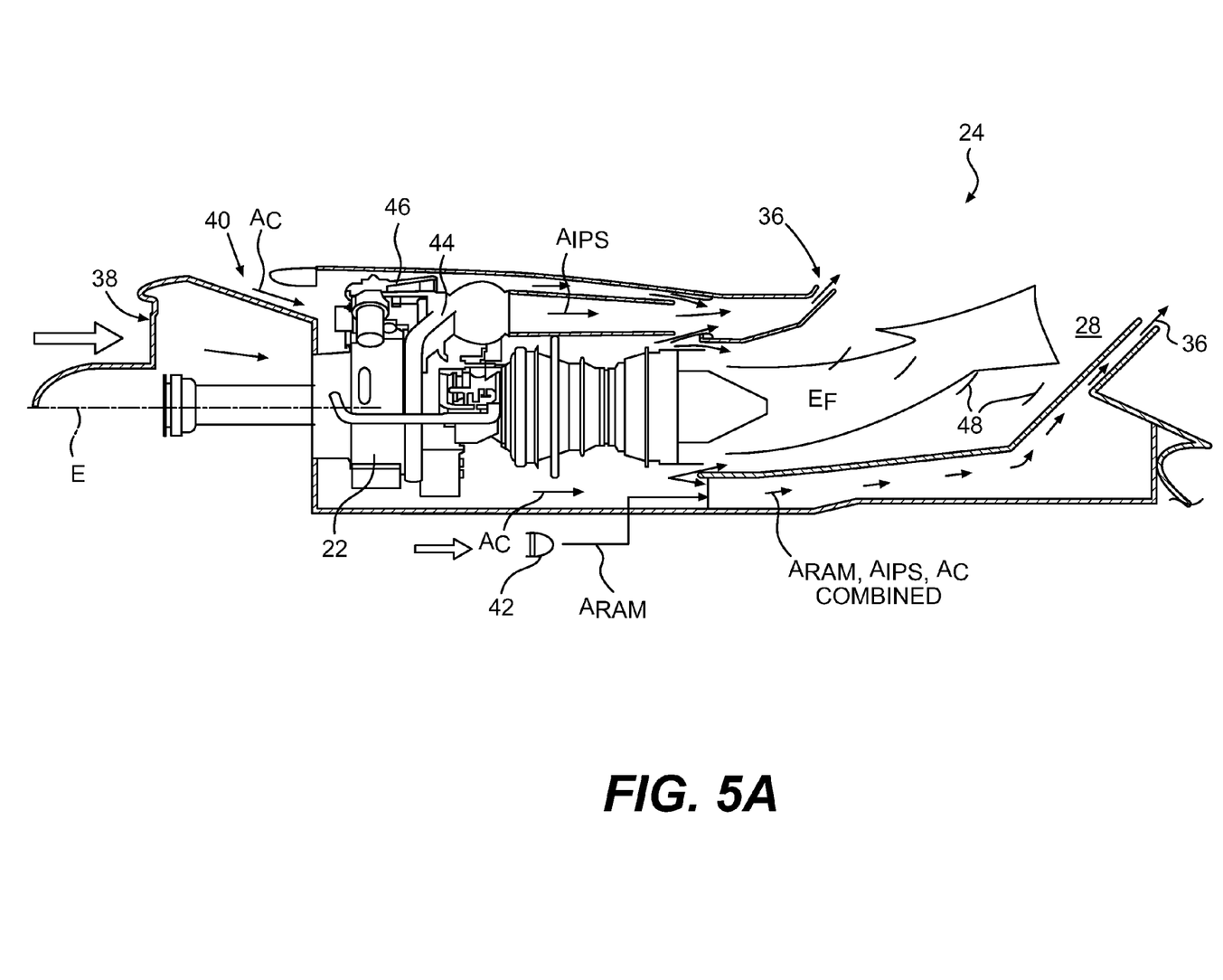
FIG. 5A is a sectional view of the IR suppressor system illustrating an exhaust flow.
Figure 5B:
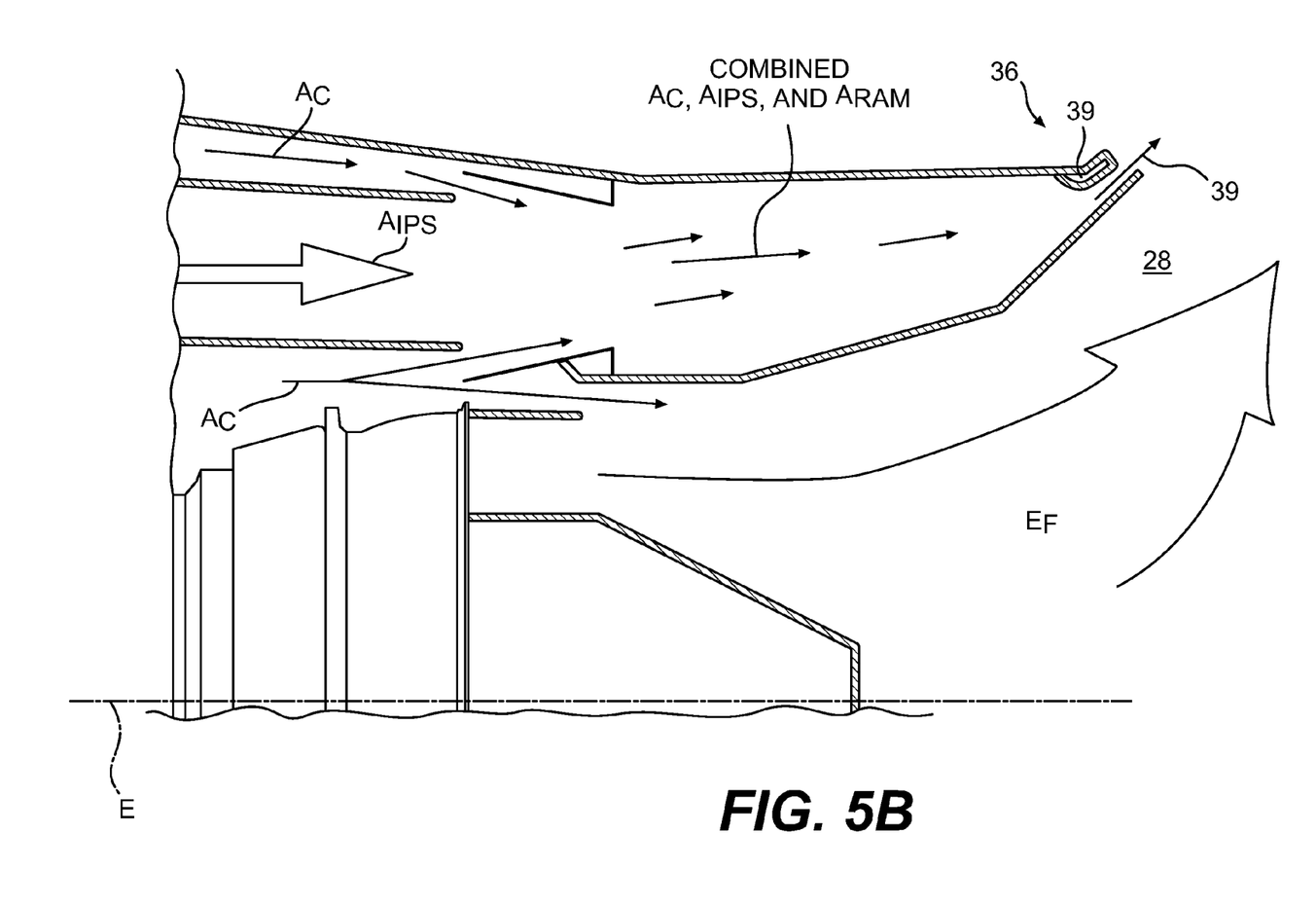
FIG. 5B is an expanded sectional view of the IR suppressor system of FIG. 5A.

Referring to FIG. 5A, the engine intake 38 provides primary airflow into the gas turbine engine 22. Various inlet particle separators (IPS) 44 (illustrated schematically) may be utilized to provide "clean" airflow into the gas turbine engine 22 to minimize foreign object damage. It should be understood that various IPS systems and flow paths to the engine 22 may be utilized with the present invention.

Figure 6:
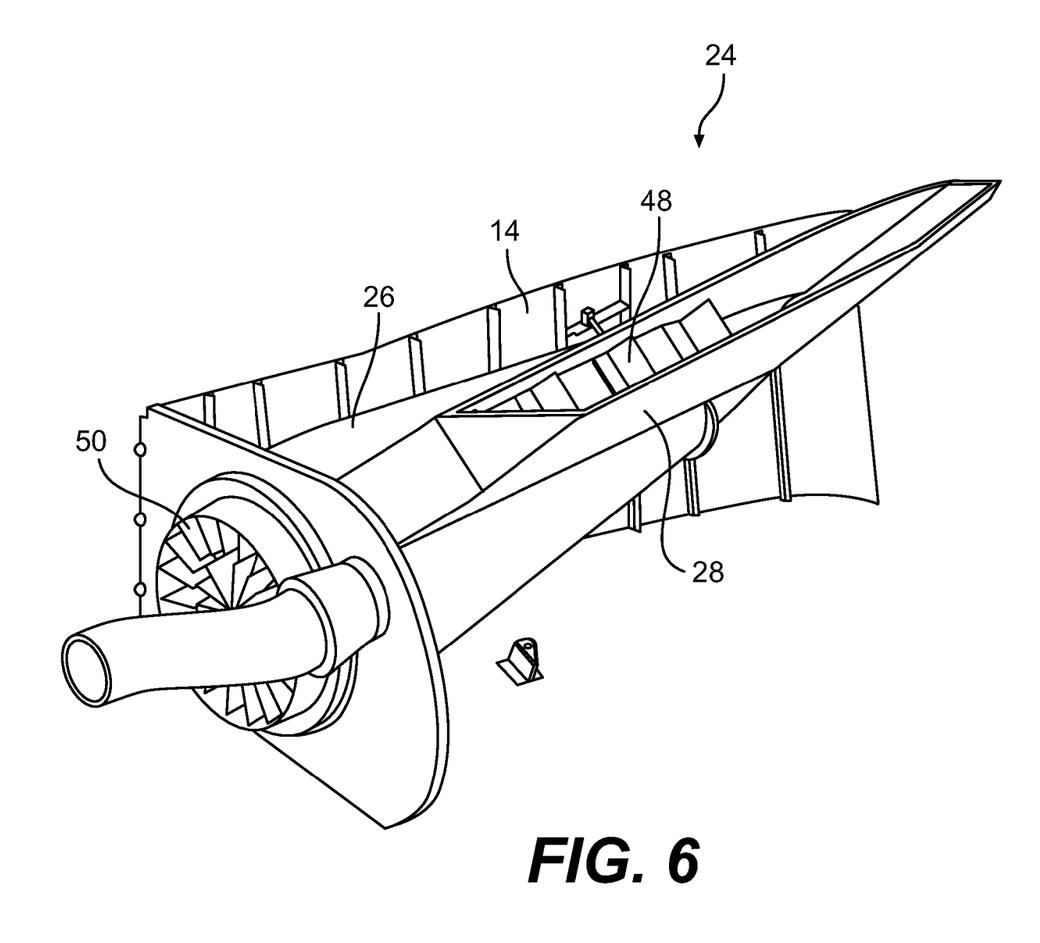
FIG. 6 is an expanded perspective view of the IR suppressor system illustrating an attachment to the airframe from a generally forward direction.

From the gas turbine engine 22, the primary flow of the high temperature exhaust gas $E_f$ may be deswirled through a deswirler 50 (FIG. 6) and communicated into the exhaust manifold 26. From the exhaust manifold 26, the high temperature exhaust gas flow $E_f$ is exhausted through the exhaust duct 28. A multitude of turning vanes 48 are located within the exhaust duct 28 to more specifically direct the high temperature exhaust gas $E_f$ in a predetermined direction. The turning vanes 48 also operate as blocking vanes (FIG. 6) so as to prevent a direct line-of-sight—from above the aircraft—through the exhaust duct 28 to the relatively hot internal components of the IRSS 20 such as the exhaust manifold 26 and to act as flow strengtheners to reduce any negative impacts to engine performance.

The one or more engine compartment air scoops 40 provide an engine compartment airflow $A_c$ which flows over the gas turbine engine 22 to convectionally cool the gas turbine engine 22 and associated systems, such as an oil cooler 46 (illustrated schematically). The engine compartment airflow $A_c$ also reduces the skin temperature of the aerodynamic exhaust faring 34 since elevated fairing temperatures can contribute to the aircraft's total IR signature. The engine compartment airflow $A_c$ is preferably combined with the engine primary airflow split such that an airflow ratio of 10% to 15% is achieved.

The IRSS 24 may also include a lining material 39 which is sized and configured so that the IR energy which passes through the exhaust duct 28 is further masked thereby. More specifically, the insulated lining material 39, in conjunction with the engine compartment airflow $A_c$ ejected through the air-cooled ejector gap 36, provides additional skin surface cooling to still further minimize the aircraft thermal signature. To this end, the lining material 39 is preferably encapsulated adjacent to the exterior walls of the exhaust duct 28 and to the internal walls of the aerodynamic exhaust fairing 34. The lining material 39 may be Aerogel or a Nomex blanket material located within the air-cooled ejector gap 36, although other materials may alternatively or additionally utilized.

The one or more fairing inlets 42 communicate high-pressure ram air $A_{ram}$ to the air-cooled ejector gap 36 to augment the pumping action of the engine compartment airflow $A_c$. That is, the high-pressure ram air $A_{ram}$ increases flow velocity of the engine compartment airflow $A_c$ to further insulate and obscure the high temperature exhaust gas flow $E_f$ exhausted through the exhaust duct 28.

Figure 7A:
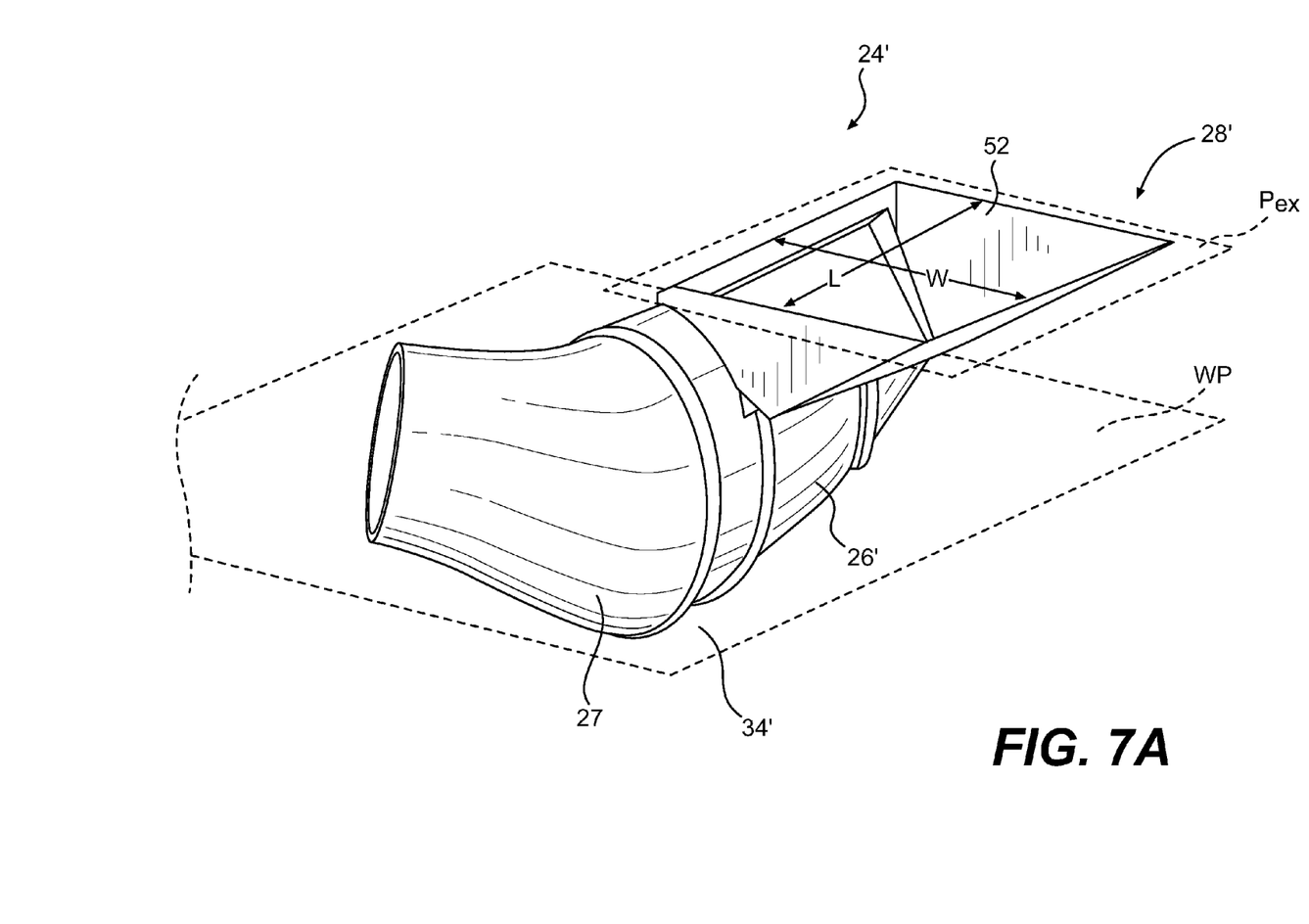
FIG. 7A is a generally front perspective view of another generic IR suppressor system according to the present invention.
Figure 7B:
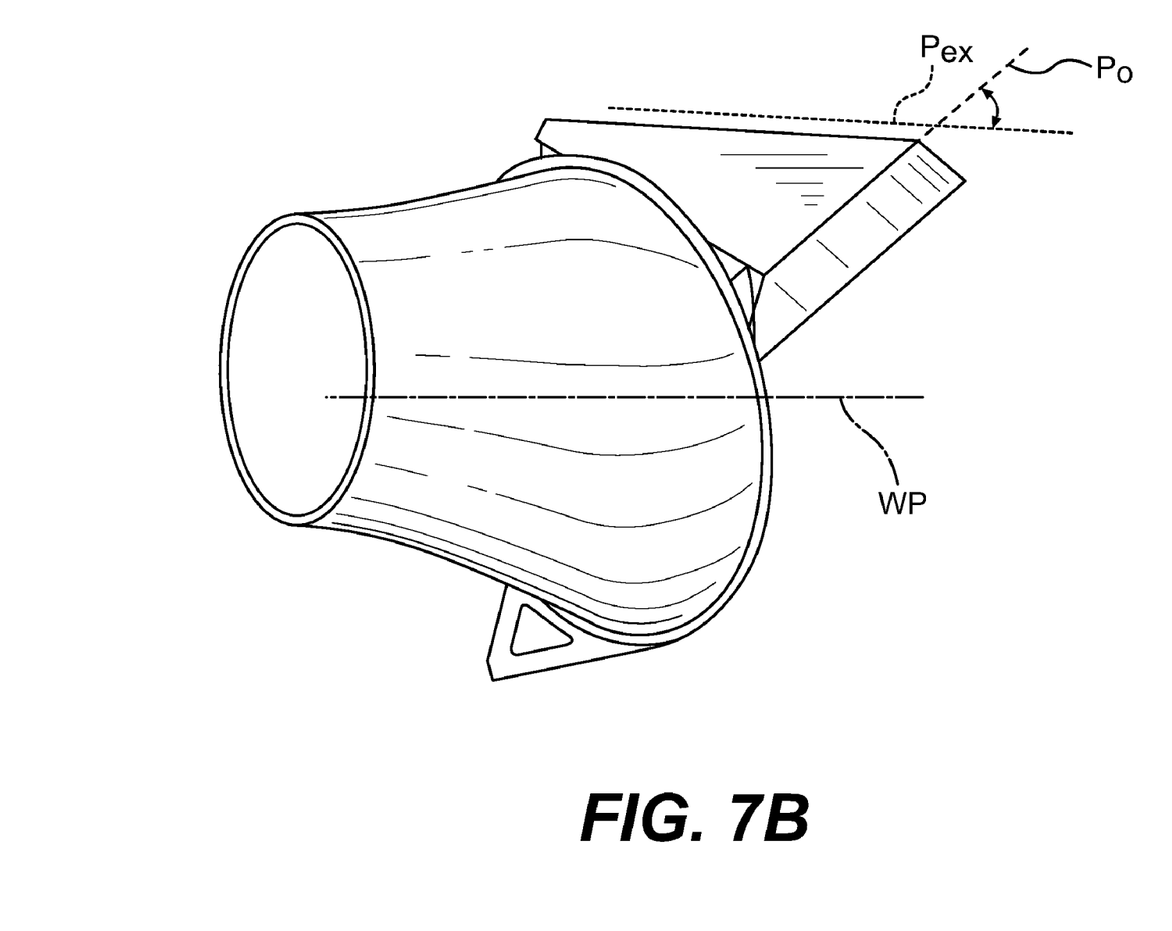
FIG. 7B is a rear perspective view of the IR suppressor system of FIG. 7A.
Figure 7C:
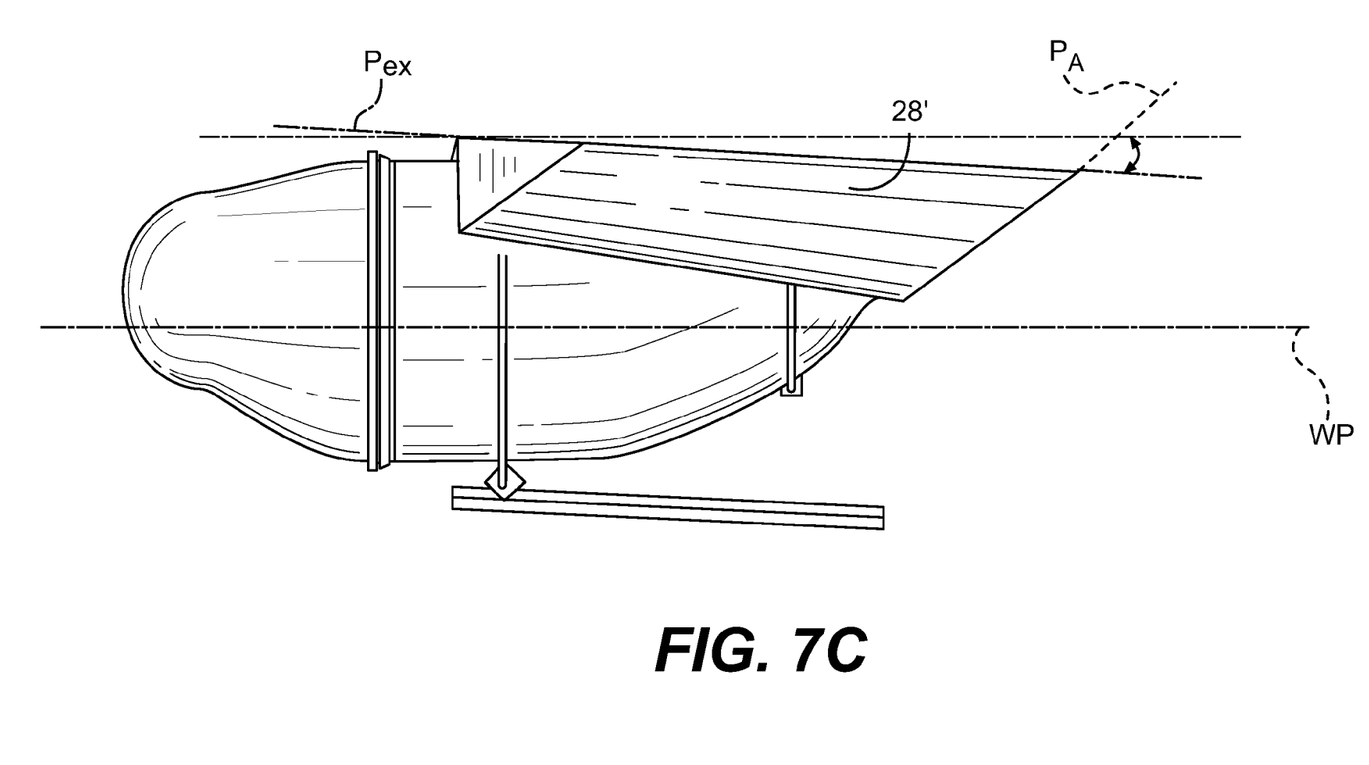
FIG. 7C is a side perspective view of the IR suppressor system of FIG. 7A.

Referring to FIG. 7A, another non-aircraft specific high aspect exhaust duct 28' which incorporates an exhaust duct aperture 52 is schematically illustrated. It should be understood that the IRSS 24' of FIG. 7A-7C are of a simplified shape so as to more specifically disclose the orientation of the exhaust duct aperture 52. Notably also, an interface transition duct 27 is located upstream of the exhaust manifold 26' to illustrate that the IRSS 24' may be alternatively integrated into or onto various vehicle packaging constraints with such transition duct 27 components. The exhaust duct aperture 52 as defined herein is the outermost edge of the high aspect ratio exhaust duct 28' and defines an exhaust duct plane $P_{ex}$. Because the IRSS 24 effectively masks the high temperature components from viewing angles 0° and below the aircraft plane W (FIG. 3), this configuration achieves significant IR signature reduction contribution.

The high aspect ratio exhaust duct 28' may be raked outward at a predefined outboard angle Po (FIG. 7B) and aft at a predefined aft angle Pa (FIG. 7C) to define an exhaust vector angle of 45° outboard (FIG. 7B) and 35° aft (FIG. 7C) relative the exhaust manifold plane P and the aircraft plane W. The vector angles as utilized herein defines the direction of the high temperature exhaust gas flow $E_f$ as opposed to the exhaust duct aperture plane $P_{ex}$, which defines the orientation of the outermost edge of the high aspect ratio exhaust duct 28'. The high aspect ratio exhaust duct 28' directs the high temperature exhaust gas flow $E_f$ upward toward the rotor system 12 and away from the aircraft plane W the , thereby minimizing and/or effectively eliminating the possibility that the high temperature exhaust gas flow $E_f$ will attach to the aerodynamic exhaust fairing 34' during forward flight. The high aspect ratio exhaust duct 28' also generates significant gas velocity to facilitate escape of the high temperature exhaust gas flow $E_f$ from the rotor downwash thus minimizing the possibility of fuselage heating and "hot spot" formation. This unique orientation, as well as the shape of the high aspect ratio exhaust duct 28', minimizes system backpressure on the gas turbine engine 22 and minimizes re-ingestion of the high temperature exhaust gas flow $E_f$ which may reduce engine performance. The exhaust duct 28' also is of a relatively compact size as only the high temperature exhaust gas flow $E_f$ need be accommodated.

The exhaust duct aperture plane $P_{ex}$ as installed on the aircraft provides a 5° pitch angle bias aft (FIG. 7C) and 0° outboard roll bias (FIG. 7B) to account for straight and level flight mission profiles. That is, the exhaust duct aperture plane $P_{ex}$, extends at a 5° angle in pitch relative to the exhaust manifold plane P such that the exhaust duct aperture plane $P_{ex}$ is not parallel to the exhaust manifold plane P (FIG. 7C) and at a 0 degree angle in roll the exhaust manifold plane P (FIG. 7B). The exhaust duct 28' bias ensures that no hot metal components of the IRSS 24 are viewable during a typical 5° nose down pitch attitude during flight. That is, the exhaust duct plane $P_{ex}$ defines the orientation of the outermost edge of the exhaust duct 28' to minimize direct line of sight views through the exhaust duct 28' and to the high temperature internal components such as the exhaust manifold 26'. It should be understood that other vector canting angles and exhaust duct plane $P_{ex}$, angle biases will also be usable with the present invention The InfraRed Suppression System (IRSS) may be attached to an aircraft engine exhaust interface in-line with the aircraft engine and upper main rotor pylon.

The IRSS minimizes impingement of engine exhaust onto adjacent aircraft structure by discharging the flow upwardly and/or outwardly, away from the fuselage thereby reducing the likelihood of "hot spots" in both hover and forward flight. Furthermore, by directing the exhaust stream upward and/or outwardly, away from the fuselage, a direct line of sight to the IR energy generated by hot exhaust manifolds is masked from ground threats.

Because the IRSS design effectively hides the hot metal exhaust components from viewing below the aircraft, the IRSS achieves a significant reduction in the entire aircraft's IR signature. Moreover, since elevated fairing temperatures can contribute to the total aircraft's IR signature, the aerodynamic fairing design, which may incorporate an extension of the high aspect ratio exhaust duct, allows for internal convective cooling to reduce the skin temperatures of the aerodynamic fairing, while the high aspect ratio exhaust duct directs the plume away from the aircraft fuselage.

The IRSS suppresses IR energy during forward flight which is contrary to conventional designs that focused primarily on hover. These conventional designs, which typically operate by diluting engine exhaust flow with ambient air, generally require a relatively high secondary bypass area and a relatively large lobed nozzle suppressor system which is not incorporated into the present invention. Thus, the IRSS may be contained with a relatively smaller space yet direct exhaust flow away from the airframe to achieve comparable or superior IR suppression performance characteristics with significantly less secondary cooling air volume.

The IRSS also does not mix large amounts of ambient air (cool) with the hot engine exhaust such that relatively large ambient air intakes are avoided so that the IRSS provides an exhaust stage which is primarily sized only for the engine exhaust. The result is a much more compact system.

The IRSS achieves approximately the same levels of IR signature reduction to ground based threats by "blocking" direct viewing of the externally visible exhaust duct from ground based threats. The IRSS also maintains the highest possible exhaust gas velocity to minimize the possibility of fuselage heating and engine exhaust re-ingestion. Furthermore, the IRSS reduces the backpressure penalty on the engine for minimal exhaust flow restrictions, thus minimizing power loss to the associated engine, as well as, the total number of parts to the overall system.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An InfraRed Suppression System for a rotary-wing aircraft which defines a waterline comprising:
    an exhaust manifold which receives an engine exhaust flow generally along a longitudinal engine axis; and
    a high aspect ratio exhaust duct which extends outward from said exhaust manifold generally transverse to said longitudinal engine axis, said high aspect ratio exhaust duct vectors said engine exhaust flow away from the waterline, said high aspect ratio exhaust duct defined as a ratio of a maximum nozzle length to a maximum nozzle width, said maximum nozzle length defined along said exhaust manifold with said ratio greater than 2:1.

2. The system as recited in claim 1, further comprising a fairing located at least partially around said high aspect ratio exhaust duct to define a cooling gap therebetween.

3. The system as recited in claim 2, wherein said cooling gap is generally rectilinear.

4. The system as recited in claim 3, wherein said cooling gap receives a secondary airflow.

5. The system as recited in claim 4, wherein said secondary airflow includes a ram airflow from one or more fairing inlets and an engine compartment airflow from one or more engine compartment air scoops.

6. The system as recited in claim 4, wherein said exhaust gas flow in relation to said secondary airflow defines less than a 1:1 ratio.

7. The system as recited in claim 1, wherein said high aspect ratio exhaust duct vectors said engine exhaust flow to a predefined aft angle and a predefined outboard angle relative to said waterline.

8. The system as recited in claim 1, wherein said high aspect ratio exhaust duct is raked longitudinally aft.

9. The InfraRed Suppression System as recited in claim 1, wherein said exhaust manifold plane contains said longitudinal engine axis.

10. The InfraRed Suppression System as recited in claim 1, wherein said high aspect ratio exhaust duct is rectilinear.

11. The InfraRed Suppression System as recited in claim 10, wherein said exhaust manifold is generally frustroconical.

12. The InfraRed Suppression System as recited in claim 11, wherein said high aspect ratio exhaust duct is located only on one side of said exhaust manifold plane.

13. The InfraRed Suppression System as recited in claim 1, wherein said maximum nozzle length of said high aspect ratio exhaust duct defines a longitudinal axis generally parallel to said longitudinal engine axis.

14. The InfraRed Suppression System as recited in claim 1, wherein said high aspect ratio exhaust duct vectors said engine exhaust flow at a predefined aft angle and a predefined outboard angle.

15. The InfraRed Suppression System as recited in claim 14, wherein said predefined aft angle is approximately 35 degrees aft.

16. The InfraRed Suppression System as recited in claim 15, wherein said predefined outboard angle is approximately 45 degrees.

17. The InfraRed Suppression System as recited in claim 1, wherein said high aspect ratio exhaust duct defines an exhaust duct aperture which defines an exhaust duct aperture plane at a 0 degree roll angle relative to said exhaust manifold plane.

18. The InfraRed Suppression System as recited in claim 1, wherein said high aspect ratio exhaust duct defines an exhaust duct aperture plane at a 5 degree aft pitch angle relative to said exhaust manifold plane.

19. The InfraRed Suppression System as recited in claim 1, wherein said high aspect ratio exhaust duct is raked longitudinally aft.

20. A rotary-wing aircraft which defines a waterline comprising:
an exhaust manifold which receives an engine exhaust flow generally along a longitudinal engine axis; and
a high aspect ratio exhaust duct which extends outward from said exhaust manifold generally transverse to said longitudinal engine axis, said high aspect ratio exhaust duct defined as a ratio of a maximum nozzle length to a maximum nozzle width, said maximum nozzle length defined along said exhaust manifold with said ratio greater than 2:1.

21. The aircraft as recited in claim 20, further comprising a rotor system, said high aspect ratio exhaust duct extends laterally from said exhaust manifold to vector said engine exhaust flow generally toward said rotor system and away from an aircraft fuselage.

22. The aircraft as recited in claim 20, wherein said high aspect ratio exhaust duct vectors said engine exhaust flow toward a predefined aft angle and a predefined outboard angle, said high aspect ratio exhaust duct defining an exhaust duct plane relative said waterline to mask viewing into the high aspect ratio exhaust duct with a line-of-sight which passes through the waterline plane.

23. The InfraRed Suppression System as recited in claim 20, wherein said high aspect ratio exhaust duct is rectilinear.

24. The InfraRed Suppression System as recited in claim 23, wherein said exhaust manifold is generally frustroconical.

25. The InfraRed Suppression System as recited in claim 24, wherein said high aspect ratio exhaust duct is located only on one side of said exhaust manifold plane.

26. The InfraRed Suppression System as recited in claim 25, wherein said high aspect ratio exhaust duct defines a longitudinal axis parallel to said longitudinal engine axis.

27. A method of suppressing IR energy of a high temperature engine exhaust flow from a rotary wing aircraft defining a waterline comprising:
vectoring a high temperature engine exhaust flow through a high aspect ratio exhaust duct which extends outward from said exhaust manifold generally transverse to said longitudinal engine axis and substantially away from the waterline, the high aspect ratio exhaust duct defined as a ratio of a maximum nozzle length to a maximum nozzle width, said ratio greater than 2:1, said maximum nozzle length defined along said exhaust manifold.

28. A method as recited in claim 27, further comprising:
vectoring the high temperature engine exhaust flow toward a rotor system with a velocity sufficient to substantially escapes a rotor downwash.

29. A method as recited in claim 27, further comprising:
communicating a secondary airflow through a cooling gap defined about the high aspect ratio exhaust duct.

30. A method as recited in claim 29, wherein the exhaust gas flow in relation to the secondary airflow defines less than a 1:1 ratio.

31. A method as recited in claim 30, further comprising:
communicating a ram airflow as the secondary airflow.

32. A method as recited in claim 30, further comprising:
communicating an engine compartment airflow as the secondary airflow.

33. A method as recited in claim 30, further comprising:
communicating a ram airflow and an engine compartment airflow as the secondary airflow.

* * * * *